(12) United States Patent
Ohashi et al.

(10) Patent No.: US 11,480,236 B2
(45) Date of Patent: Oct. 25, 2022

(54) BALL SCREW DEVICE

(71) Applicant: THK CO., LTD., Tokyo (JP)

(72) Inventors: Tomofumi Ohashi, Tokyo (JP); Bin Zhao, Tokyo (JP); Sho Iwashiro, Tokyo (JP); Yoshihiro Kudo, Tokyo (JP); Wataru Saito, Tokyo (JP); Mika Oki, Tokyo (JP); Takuya Miyazaki, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 16/960,382

(22) PCT Filed: Dec. 7, 2018

(86) PCT No.: PCT/JP2018/045131
§ 371 (c)(1),
(2) Date: Jul. 7, 2020

(87) PCT Pub. No.: WO2019/142536
PCT Pub. Date: Jul. 25, 2019

(65) Prior Publication Data
US 2020/0355250 A1 Nov. 12, 2020

(30) Foreign Application Priority Data
Jan. 22, 2018 (JP) .............................. JP2018-008048

(51) Int. Cl.
*F16H 25/20* (2006.01)
*F16H 25/22* (2006.01)

(52) U.S. Cl.
CPC .............................. *F16H 25/2214* (2013.01)

(58) Field of Classification Search
CPC ............... F16H 2025/228; F16H 25/22; F16H 25/2204; F16H 25/2214
See application file for complete search history.

(56) References Cited

U.S. PATENT DOCUMENTS 3,156,133 A * 11/1964 Anthony ............. F16H 25/2223
74/424.83
7,017,437 B1 3/2006 Zernickel et al.
(Continued)

FOREIGN PATENT DOCUMENTS

| JP | 2001-165274 A | 6/2001 |
|---|---|---|
| JP | 2003-524121 A | 8/2003 |
| JP | 2010-106895 A | 5/2010 |

OTHER PUBLICATIONS

International Search Report dated Mar. 12, 2019, issued in counterpart International Application No. PCT/JP2018/045131. (1 page).

*Primary Examiner* — Zakaria Elahmadi
(74) *Attorney, Agent, or Firm* — WHDA, LLP

(57) ABSTRACT

The ball screw device includes: a screw shaft having an N number (N is an integer equal to or larger than 2) of rolling grooves having the same lead; balls configured to roll in the rolling grooves; and a nut member, which is assembled to the screw shaft through intermediation of the balls, and includes one or a plurality of endless circulation paths configured to circulate the balls around the screw shaft. Each of the endless circulation paths of the nut member includes: an N number of load portions, which are configured to allow the balls to roll thereon while bearing a load, and correspond to the N number of rolling grooves, respectively; and an N number of no-load portions, which each couple adjacent ones of the load portions, and are configured to allow the balls to move between the N number of rolling grooves.

5 Claims, 4 Drawing Sheets

(56) References Cited

U.S. PATENT DOCUMENTS

| | | | |
|---|---|---|---|
| 9,133,922 B2* | 9/2015 | Chang | F16H 25/2219 |
| 2006/0169079 A1* | 8/2006 | Lee | F16H 25/2233 |
| | | | 74/424.82 |
| 2010/0122597 A1* | 5/2010 | Liou | F16H 25/2214 |
| | | | 74/424.88 |
| 2015/0033891 A1* | 2/2015 | Sakaguchi | F16H 25/2219 |
| | | | 74/424.87 |

* cited by examiner

BALL SCREW DEVICE

TECHNICAL FIELD

The present invention relates to a ball screw device, which is capable of mutually converting a rotary motion and a linear motion.

BACKGROUND ART

A ball screw device is a mechanical element capable of mutually converting a rotary motion and a linear motion and is often used for the purpose of converting a rotary motion generated by a servomotor into a linear motion, for example, in various working machines, conveyance apparatus, and industrial robots. The ball screw device includes a large number of balls, a screw shaft, and a nut member. The screw shaft has spiral rolling grooves formed in an outer peripheral surface of the screw shaft to allow the balls to roll in the spiral rolling grooves. The nut member is threadedly engaged with a periphery of the screw shaft through intermediation of the balls. Moreover, the nut member includes an endless circulation path for the balls. The endless circulation path of the nut member includes a load path and a no-load path. The load path allows the balls to roll therein while bearing a load between the screw shaft and the nut member. The no-load path connects both ends of the load path and returns the balls by one or several turns of the rolling grooves.

The spiral rolling grooves formed in the screw shaft are each formed so as to have a constant lead. The "lead" is a distance by which the nut member advances in an axial direction as a result of one rotation of the screw shaft. As the lead is larger, the nut member can be moved at higher speed by the rotation of the screw shaft. For improvement in rated load of the ball screw device and improvement in rigidity of the nut member with respect to the screw shaft, the screw shaft having a large lead is formed as a multi-groove screw, and a plurality of spiral rolling grooves are formed in the outer peripheral surface of the screw shaft. Moreover, the nut member corresponding to the multi-groove screw includes an endless circulation path for the balls in which the number of circuits is the same as the number of the rolling grooves, to thereby increase the number of balls configured to bear the load between the screw shaft and the nut member.

CITATION LIST

Patent Literature

[PTL] JP 2010-106895 A

DISCLOSURE OF THE INVENTION

Problems to be Solved by the Invention

In general, in the endless circulation path formed in the nut member, a length of the load path is set so as to correspond to about one turn or about several turns around the screw shaft. This is for ease of construction of the no-load path connecting the both ends of the load path while securing a sufficient length of the load path to maximize the number of balls configured to bear the load.

Meanwhile, when the length of the load path is set so as to be equal to or larger than about one turn around the screw shaft, an axial length of the nut member becomes longer than at least the lead of the rolling groove formed in the screw shaft. Therefore, the nut member to be combined with the screw shaft having a large lead of the rolling groove as in the case of the multi-groove screw mentioned above cannot be shortened in axial length, with the result that downsizing of the nut member is difficult.

Means for Solving the Problems

The present invention has been made in view of the problem described above, and has an object to provide a ball screw device of a so-called multi-groove screw type, which is capable of securing a sufficient length of a load path while setting a length of an endless circulation path in an axial direction of a screw shaft to be shorter than a lead of rolling groove and is capable of downsizing a nut member while having a sufficient load-bearing performance.

That is, a ball screw device includes: a screw shaft having an N number (N is an integer equal to or larger than 2) of rolling grooves having the same lead; balls configured to roll in the rolling grooves; and a nut member, which is assembled to the screw shaft through intermediation of the balls, and includes one or a plurality of endless circulation paths configured to circulate the balls around the screw shaft. In the ball screw device, each of the endless circulation paths of the nut member includes: an N number of load portions, which are configured to allow the balls to roll thereon while bearing a load, and correspond to the N number of rolling grooves, respectively; and an N number of no-load portions, which each couple adjacent ones of the load portions, and are configured to allow the balls to move between the N number of rolling grooves.

Effects of the Invention

According to the present invention, in the ball screw device of the so-called multi-groove screw type in which the rolling grooves have a large lead, a sufficient length of the load path can be secured while setting the length of the endless circulation path in the axial direction of the screw shaft to be shorter than the lead of the rolling grooves, thereby being capable of downsizing the nut member while achieving a sufficient load-bearing performance.

MODE FOR CARRYING OUT THE INVENTION

Now, a detailed description is made of a ball screw device according to the present invention with reference to accompanying drawings.

Figure 1:
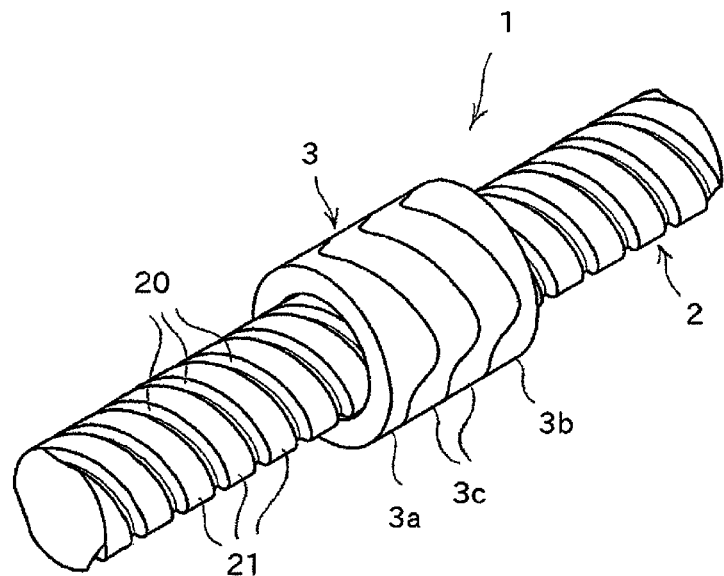
FIG. 1 is a perspective view for illustrating an example of a ball screw device to which the present invention is applied.

FIG. 1 shows an example of a ball screw device to which the present invention is applied. The ball screw device 1 includes a screw shaft 2 and a cylindrical nut member 3. The screw shaft 2 has rolling grooves 20 for balls formed in a spiral shape in an outer peripheral surface of the screw shaft 2. The nut member 3 is threadedly engaged with a periphery of the screw shaft 2 through intermediation of a large number of balls. Moreover, the nut member 3 includes an endless circulation path for the balls. The balls are interposed between the screw shaft 2 and the nut member 3. For example, the nut member 3 moves in an axial direction of the screw shaft 2 through rotation of the screw shaft 2 relative to the nut member 3, or the screw shaft 2 moves in an axial direction of the nut member 3 through rotation of the nut member 3 relative to the screw shaft 2.

The screw shaft 2 is a so-called multi-groove screw, and a plurality of rolling grooves 20 are formed in the outer peripheral surface of the screw shaft 2. In the ball screw device illustrated in FIG. 1, three rolling grooves 20 are formed in the outer peripheral surface of the screw shaft 2, and the rolling grooves 20 have the same lead. Thus, the rolling grooves 20 are formed in the outer peripheral surface of the screw shaft 2 at a pitch corresponding to ⅓ of the lead along the axial direction. Moreover, the three rolling grooves 20 are evenly arranged in the outer peripheral surface of the screw shaft 2 at equal intervals along a circumferential direction. Moreover, thread portions 21 are each formed between adjacent ones of the rolling grooves 20, and the thread portions 21 define an outer diameter of the screw shaft 2. The number of the rolling grooves 20 formed in the screw shaft 2 may be suitably changed as long as the number of rolling grooves 20 is equal to or larger than two.

The nut member 3 is formed into a cylindrical shape with a through hole through which the screw shaft 2 is inserted. The nut member includes a plurality of nut elements 3a, 3b, and 3c each formed into a ring shape. The nut elements 3a, 3b, and 3c are arranged on one another along the axial direction of the screw shaft 2. The nut elements include a pair of end elements 3a and 3b and intermediate elements 3c sandwiched between the end elements 3a and 3b. In the example illustrated in FIG. 1, two intermediate elements 3c are arranged between the pair of end elements 3a and 3b. The pair of end elements 3a and 3b are members having the same shape, and are arranged so as to be opposed to each other in reverse orientation. Moreover, the two intermediate elements 3c are members having the same shape.

Figure 2:
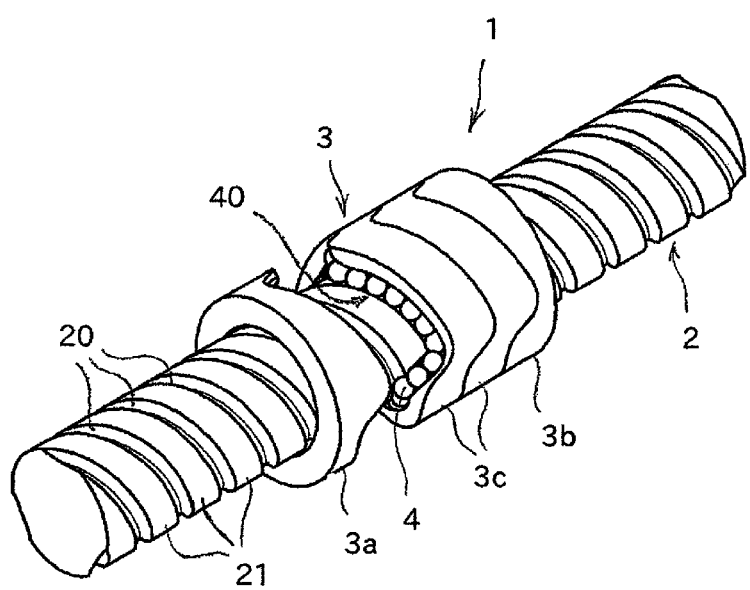
FIG. 2 is an exploded perspective view for illustrating the ball screw device illustrated in FIG. 1.

FIG. 2 is an exploded perspective view for illustrating a state in which the end element 3a is removed from the nut member 3. An endless circulation path 40 for balls 4 extending around the screw shaft 2 by one turn is provided at each joining portion between adjacent ones of the nut elements 3a, 3b, and 3c. That is, the endless circulation path 40 for the balls 4 is provided at a boundary portion between the end element 3a and the intermediate element 3c adjacent to each other, at a boundary portion between the two intermediate elements 3c, and at a boundary portion between the intermediate element 3c and the end element 3b. In the nut member 3 as a whole, three circuits of endless circulation paths 40 are provided.

The number of circuits of endless circulation paths 40 can be suitably increased or decreased in accordance with the number of intermediate elements 3c. For example, when one intermediate element 3c is sandwiched between the pair of end elements 3a and 3b, two circuits of endless circulation paths 40 are provided to the nut member 3. Moreover, when three intermediate elements 3c are sandwiched, four circuits of endless circulation paths 40 are provided to the nut member 3. Further, when the pair of end elements are directly joined to each other without use of the intermediate element, only one circuit of endless circulation path 40 can be provided to the nut member 3.

Figure 3:
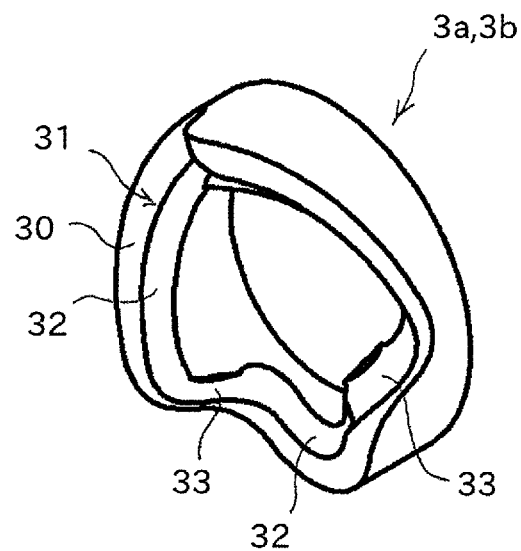
FIG. 3 is a perspective view for illustrating an end element of a nut member.
Figure 4:
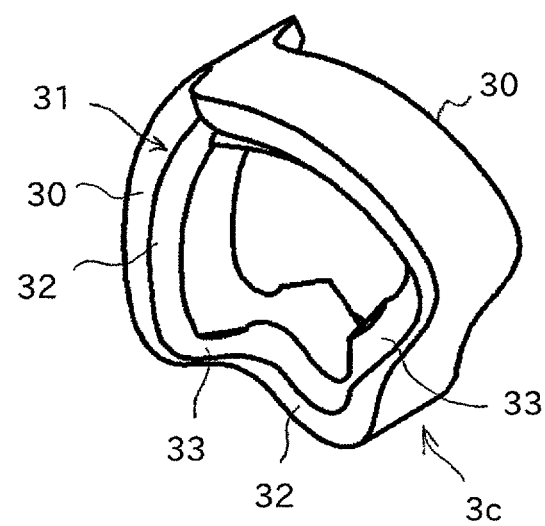
FIG. 4 is a perspective view for illustrating an intermediate element of the nut member.

FIG. 3 is a perspective view for illustrating the end element 3a, 3b. FIG. 4 is a perspective view for illustrating the intermediate element 3c. The end element 3a, 3b and the intermediate element 3c are each formed into a ring shape having an inner diameter larger than the outer diameter of the screw shaft 2, and joining surfaces 30 thereof with respect to another adjacent one of the nut elements 3a, 3b, and 3c are each formed into a curved-surface shape. Only one end surface of the end element 3a, 3b in the axial direction is formed as the joining surface 30, and both end surfaces of the intermediate element 3c are formed as the joining surfaces 30. Such a feature is the difference between the end element 3a, 3b and the intermediate element 3c.

A circulation groove 31 forming the endless circulation path 40 for the balls 4 is formed at a corner portion between an inner peripheral surface of each of the end element 3a, 3b and the intermediate element 3c and corresponding one of the joining surfaces 30. For example, at the boundary portion at which the end element 3a and the intermediate element 3c are adjacent to each other, the circulation groove 31 of the end element 3a and the circulation groove 31 of the intermediate element 3c are opposed to and combined with each other, thereby constructing the endless circulation path 40 for the balls 4. The end element 3a, 3b has the circulation groove 31 only in one end surface in the axial direction, and the intermediate element 3c has the circulation grooves 31 in both end surfaces in the axial direction.

The one circulation groove 31 formed in the end element 3a, 3b or the intermediate element 3c corresponds to the plurality of rolling grooves 20 formed in the screw shaft 2. When an N number of rolling grooves 20 (N is a natural number equal to or larger than 2) are formed in the screw shaft 2, the one circulation groove 31 is formed of an N number of load portions 32 and an N number of no-load portions 33. The load portions 32 are opposed to the rolling grooves 20 of the screw shaft 2, and the balls 4 roll between the load portions 32 and the rolling grooves 20 of the screw shaft 2 while bearing a load. Meanwhile, the no-load portions 33 each couple the load portions 32 and are opposed to the thread portions 21 of the screw shaft, and the balls 4 which roll on the no-load portions 33 are released from the load and climb over the thread portions 21 of the screw shaft 2. Moreover, the load portions 32 and the no-load portions 33 are alternately provided along a circumferential direction of the circulation groove 31, and as a result, the circulation groove 31 forms a ring shape. The end element 3a, 3b and the intermediate element 3c illustrated in FIG. 3 and FIG. 4 are adaptable to the case in which three rolling grooves 20 are formed in the screw shaft 2, and the circulation groove 31 has three sets of a combination of the load portion 32 and the no-load portion 33.

The circulation groove 31 is formed at the corner portion between the inner peripheral surface of the end element 3a, 3b or the intermediate element 3c and the joining surface 30. Therefore, the joining surface 30 is formed into a curved-surface shape extending along a locus of the circulation groove 31, that is, a locus of the endless circulation path 40.

Figure 5:
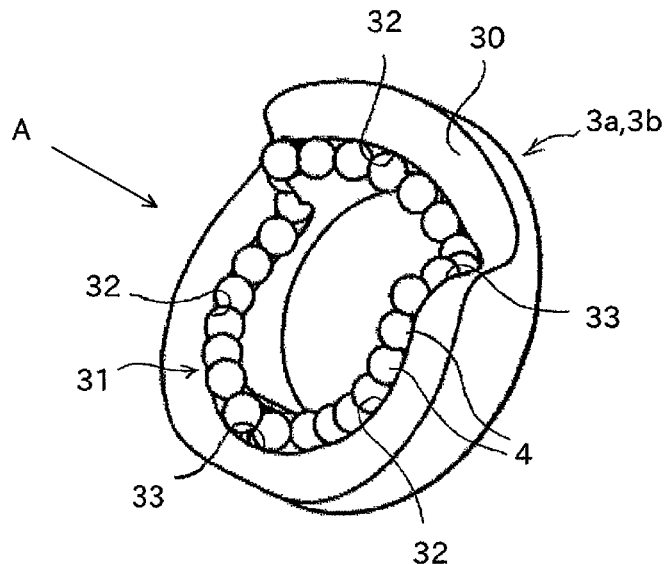
FIG. 5 is a perspective view for illustrating a state in which balls are arranged in the end element of the nut member.
Figure 6:
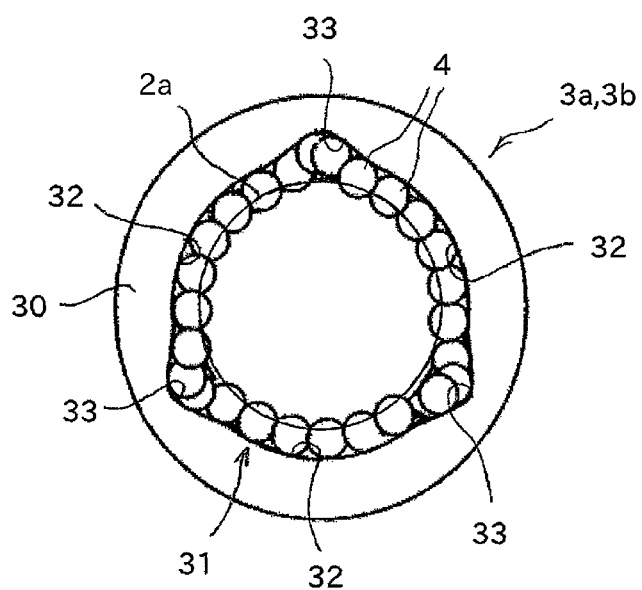
FIG. 6 is a view as seen in the direction indicated by the arrow of FIG. 5.

FIG. 5 and FIG. 6 are illustrations of a state in which the balls are arranged in the circulation groove 31 formed in the end element 3a, 3b. FIG. 6 is a front view of the end element 3a, 3b illustrated in FIG. 5 as observed from the direction indicated by the arrow A. The plurality of sets of the load portion 32 and the no-load portion 33 included in one circulation groove 31 are evenly arranged around the screw shaft 2. FIG. 6 corresponds to an example in which three rolling grooves 20 are formed in the screw shaft 2, and three sets of the combination of the load portion 32 and the no-load portion 33 are arranged such that the periphery of the screw shaft 2 is divided at 120-degrees intervals. Thus, when the screw shaft 2 has an N number of rolling grooves, the periphery of the screw shaft corresponding to 360 degrees is divided into an N number so that an N number of sets of the combination of the load portion 32 and the no-load portion 33 are evenly arranged.

Reference number 2a of FIG. 6 indicates an outer diameter of the screw shaft 2. The plurality of load portions 32 included in one circulation groove 31 correspond to different rolling grooves 20 formed in the screw shaft 2, and the balls 4 roll in the rolling grooves 20 at the load portions 32. Meanwhile, the no-load portions 33 each couple adjacent ones of the load portions 32, and the balls 4 which roll at the no-load portion 33 climb over the thread portion 21 of the screw shaft 21 to move between adjacent ones of the rolling grooves 20. The balls 4 which roll at the load portion 32 move in the axial direction of the screw shaft 2 while spirally revolving around the screw shaft 2, but the no-load portion 33 allows the balls 4 to move in an opposite direction along the axial direction and passes the balls 4 to the next load portion 32. Therefore, the endless circulation path 40 in which the balls 4 circulate has a wavy locus around the screw shaft 2.

In FIG. 5 and FIG. 6, illustration is given of the state in which the balls 4 are arranged in the circulation groove 31 of the end element 3a, 3b. This similarly applies to a case in which the balls 4 are arranged in the circulation groove 31 of the intermediate element 3c. The end element 3a, 3b has the circulation groove 31 only in one end surface in the axial direction, whereas the intermediate element 3c has the same circulation groove 31 in both end surfaces in the axial direction. This point is the only difference.

The end elements 3a and 3b and the intermediate element 3c having the configuration described above are placed on one another in the axial direction of the screw shaft 2, thereby completing the nut member 3 having a plurality of circuits of endless circulation paths 40. The end elements 3a and 3b and the intermediate element 3c can be coupled to one another with use of bolts passing there through in the axial direction. Alternatively, a tubular housing having an accommodation space for the end elements 3a and 3b and the intermediate element 3c may be provided, and the nut member 3 may be constructed by closing the accommodation space having the end elements 3a and 3b and the intermediate element 3c inserted therein. When the housing is provided, a flange portion to be used for fixing the nut member 3 to another device can be provided to the housing so that the shape of the end element 3a, 3b or the intermediate element 3c can be simplified.

Figure 7:
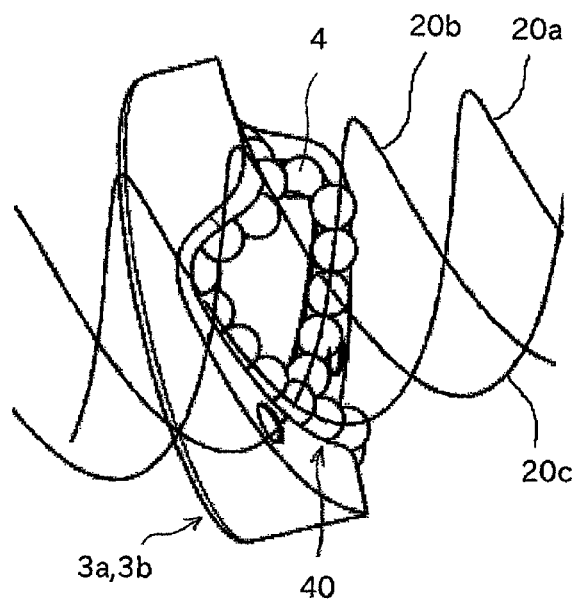
FIG. 7 is an explanatory view for illustrating a relationship between rolling grooves of a screw shaft and an endless circulation path for the balls.

FIG. 7 is a three-dimensional illustration of a relationship between the balls 4 arranged on the endless circulation path 40 and the three rolling grooves 20a, 20b, and 20c formed in the screw shaft 2. In this case, the endless circulation path 40 includes three sets of the combination of the load portion 32 and the no-load portion 33, and each load portion 32 corresponds to any one of the three rolling grooves 20a, 20b, and 20c.

As mentioned above, when the balls 4 circulate in the endless circulation path 40, the balls 4 spirally revolve around the screw shaft 2 along the rolling grooves 20 (the three rolling grooves 20a, 20b, and 20c of FIG. 7) of the screw shaft 2 at the load portions 32 and advance in the axial direction of the screw shaft 2. After one revolution around the screw shaft 2, the rolling groove 20 advances by only one lead in the axial direction. However, the sets of the load portion 32 and the no-load portion 33 are provided in three equivalent sections at 120-degrees intervals around the screw shaft 2, and hence the balls 4 which roll on one load portion 32 advances by only ⅓ of the lead of the screw shaft 2 in the axial direction. That is, when an N number of rolling grooves 20 are formed in the screw shaft 2, with regard to an N number of load portions 32 included in the endless circulation path 40, a length of each load portion 32 along the axial direction of the screw shaft 2 is 1/N of the lead of the rolling groove 20.

Meanwhile, when an N number of rolling grooves 20 are formed in the screw shaft 2, an N number of load portions 32 are included in one circuit of the endless circulation path 40, and hence an overall length of the load portions 32 included in one circuit of the endless circulation path 40 is substantially equal to a length corresponding to one turn of the rolling groove 20 around the screw shaft 2. Therefore, a sufficient number of balls configured to bear the load between the screw shaft 2 and the nut member 3 can be secured.

Thus, in the ball screw device according to the present invention, the length of each endless circulation path 40 in the axial direction with respect to the lead of the rolling groove 20, that is, a width of the endless circulation path 40 along the axial direction of the screw shaft 2 can be set to be smaller. Therefore, when the present invention is applied to the ball screw device of the multi-groove screw type in which the lead is set to be larger, the axial length of the nut member 3 can be shortened, thereby being capable of downsizing of the nut member 3.

Moreover, even when the nut member 3 is downsized, a sufficient number of the balls 4 configured to bear the load between the screw shaft 2 and the nut member 3 can be secured, thereby being capable of downsizing the nut member 3 without degradation in load-bearing performance.

Further, the plurality of combinations of the load portion 32 and the no-load portion 33 included in one circuit of the endless circulation path 40 are evenly arranged around the screw shaft 2. Therefore, even when any one of the screw shaft 2 and the nut member 3 is to be rotated, the action of the balls 4 with respect to a rotation center is well balanced. Therefore, vibration along with the rotation of the screw shaft 2 or the nut member 3 is less liable to occur, and hence the screw shaft 2 or the nut member 3 can be used with high-speed rotation.

That is, according to the present invention, with the combination of the screw shaft 2 of the large-lead and multi-groove type and the compact nut member 3, the ball screw device 1 that enables high-speed conveyance of machines and devices can be achieved.

Figure 8:
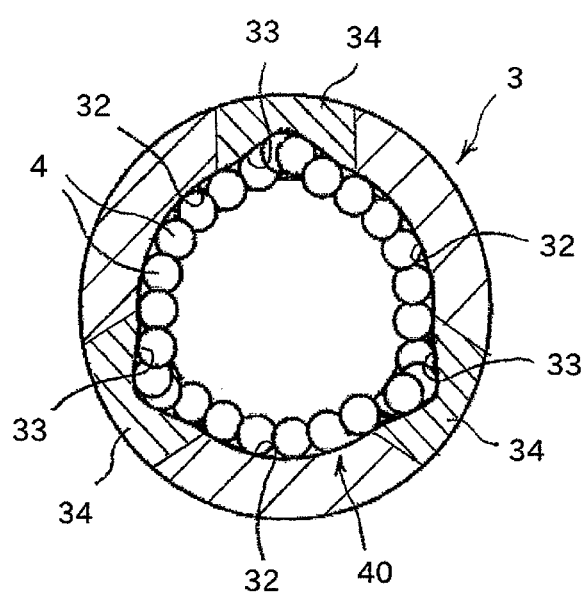
FIG. 8 is a longitudinal sectional view for illustrating another example of the nut member.

In the embodiment described above, the nut member 3 is formed of the combination of the plurality of nut elements 3a, 3b, and 3c. However, as long as the endless circulation path 40 including a plurality of load portions 32 and a plurality of no-load portions 33 can be formed in the inner peripheral surface of the nut member 3, the nut member 3 may be a single member. For example, as illustrated in FIG. 8, piece-like deflectors 34 each having the no-load portion 33 may be fitted to the nut member 3 from the outer peripheral surface of the nut member 3 to provide no-load portions 33 on the inner peripheral surface of the nut member.

The invention claimed is:

1. A ball screw device, comprising:
a screw shaft having an N number of rolling grooves having a same lead, each of the N number of rolling grooves extending around the screw shaft along an axial direction of the screw shaft and respectively forming a different continuous-path along the axial direction of the screw shaft;
balls configured to roll in the rolling grooves; and
a nut member, which is assembled to the screw shaft through intermediation of the balls, and includes one or a plurality of endless circulation paths configured to circulate the balls around the screw shaft,
wherein each of the endless circulation paths of the nut member includes:
an N number of load portions, which are configured to allow the balls to roll thereon while bearing a load, and correspond to the N number of rolling grooves, respectively; and
an N number of no-load portions, each of which couples adjacent ones of the load portions, and are configured to allow the balls to move between the N number of rolling grooves,
wherein each of the endless circulation paths makes only one round around the screw shaft, and
wherein N is an integer equal to or larger than 2.

2. The ball screw device according to claim 1, wherein the load portion and the no-load portion are combined to form one set, and an N number of sets are evenly arranged around the screw shaft.

3. The ball screw device according to claim 2, wherein a length of each of the load portions along the axial direction of the screw shaft is 1/N of a lead of each of the rolling grooves.

4. The ball screw device according to claim 1,
wherein the nut member includes a plurality of nut elements which are arranged on one another along the axial direction of the screw shaft, and
wherein one circuit of the endless circulation path for the balls including the N number of load portions and the N number of no-load portions is formed at a joining portion between adjacent ones of the nut elements.

5. The ball screw device according to claim 1, wherein a pitch between adjacent ones of the N number of rolling grooves is 1/N of the lead of the rolling grooves.

* * * * *